(12) United States Patent
Solomon et al.

(10) Patent No.: US 6,691,961 B2
(45) Date of Patent: *Feb. 17, 2004

(54) APPARATUS FOR PROVIDING DESKTOP MOBILITY FOR DESKTOP ELECTRONIC DEVICES

(75) Inventors: Gary B. Solomon, Dallas, TX (US); Mark B. Solomon, Norwood, MA (US)

(73) Assignee: SolVisions Technologies Int'l, Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/981,796

(22) Filed: Oct. 17, 2001

(65) Prior Publication Data

US 2002/0056797 A1 May 16, 2002

Related U.S. Application Data

(63) Continuation-in-part of application No. 09/503,066, filed on Feb. 12, 2000, now Pat. No. 6,367,748.

(51) Int. Cl.$^7$ ................................................. A47K 1/04
(52) U.S. Cl. .................. 248/129; 248/346.11; 248/919
(58) Field of Search ........................... 248/129, 346.03, 248/346.11, 346.01, 349.1, 917, 918, 916, 646

(56) References Cited

U.S. PATENT DOCUMENTS

| 2,306,209 A | 12/1942 | Elofson et al. |
| 2,311,928 A | 2/1943 | Buehler |
| 4,190,303 A | 2/1980 | Ellis |
| 4,561,619 A | 12/1985 | Robillard et al. |
| 4,615,502 A | 10/1986 | McLaughlin |
| 4,624,510 A | 11/1986 | Jedziniak |
| 4,681,378 A | 7/1987 | Hellman, III |
| 4,696,522 A | 9/1987 | Lowe |
| 4,709,972 A | 12/1987 | LaBudde et al. |
| 4,783,879 A | 11/1988 | Weaver |
| 4,828,342 A | 5/1989 | Stefan |
| 4,844,387 A | 7/1989 | Sorgi et al. |
| 4,901,972 A | 2/1990 | Judd et al. |
| 4,925,240 A | 5/1990 | Peters |
| 4,989,291 A | 2/1991 | Parent |

(List continued on next page.)

FOREIGN PATENT DOCUMENTS

| JP | 08125952 | 5/1996 |
| JP | 08314570 | 11/1996 |
| JP | 11069536 | 3/1999 |
| JP | 11137343 | 5/1999 |
| JP | 11262415 | 9/1999 |
| JP | 11306584 | 11/1999 |
| WO | WO 99/55196 | 11/1999 |
| WO | WO 00/45011 | 8/2000 |

OTHER PUBLICATIONS

Compaq, "Hear That Humming? That's the Sound of Your Business", eWeek, Jun. 5, 2000, vol. 17, No. 23.
Reid Tool Supply Company, Catalog, 2000.

Primary Examiner—Ramon O. Ramirez

(57) ABSTRACT

Desktop mobility is provided for a desktop electronic device by at least one mobility assembly to translate the desktop electronic device from a first position to a second position on a desktop. The mobility assembly(s) may be integral with a housing of the desktop electronic device, connected to the desktop electronic device, or combined with a platform used to provide mobility for the desktop electronic device. The mobility assembly(s) include at least one primary revolving member and at least one secondary revolving member in contact therewith. The primary and secondary revolving members may be spherically or cylindrically shaped, independently. The mobility assembly(s) may be selectably engaged with and disengaged from the desktop. Additionally, various braking mechanisms may be selectably applied to restrict movement of the desktop electronic device.

36 Claims, 10 Drawing Sheets

U.S. PATENT DOCUMENTS

| | | |
|---|---|---|
| 5,080,236 A | 1/1992 | Conner |
| 5,199,360 A | 4/1993 | Koistinen |
| 5,263,678 A | 11/1993 | Birkbeck |
| 5,276,524 A | 1/1994 | Inoue et al. |
| 5,355,146 A | 10/1994 | Chiu et al. |
| 5,470,041 A | 11/1995 | Cucinotta |
| 5,557,186 A | 9/1996 | McMurtrey |
| 5,572,935 A | 11/1996 | Schairbaum |
| 5,584,546 A | 12/1996 | Gurin et al. |
| 5,595,074 A | 1/1997 | Munro |
| 5,630,566 A | 5/1997 | Case |
| 5,667,207 A | 9/1997 | Pistole |
| 5,683,064 A | 11/1997 | Copeland et al. |
| 5,725,189 A | 3/1998 | Landy |
| 5,758,935 A | 6/1998 | Coonan |
| 5,835,342 A | 11/1998 | Hunte |
| 5,867,369 A | 2/1999 | Antonuccio et al. |
| 5,900,708 A | 5/1999 | Den Engelse et al. |
| 5,927,669 A | 7/1999 | Sassman |
| 5,947,570 A | 9/1999 | Anderson et al. |
| 5,961,134 A | 10/1999 | Congleton |
| 5,961,192 A | 10/1999 | Bernart et al. |
| 5,980,008 A | 11/1999 | Stoever |
| 6,027,090 A | 2/2000 | Liu |
| 6,036,288 A | 3/2000 | Shih |
| 6,086,315 A | 7/2000 | Poindexter et al. |
| 6,099,093 A | 8/2000 | Spence |
| 6,179,264 B1 | 1/2001 | Moy et al. |

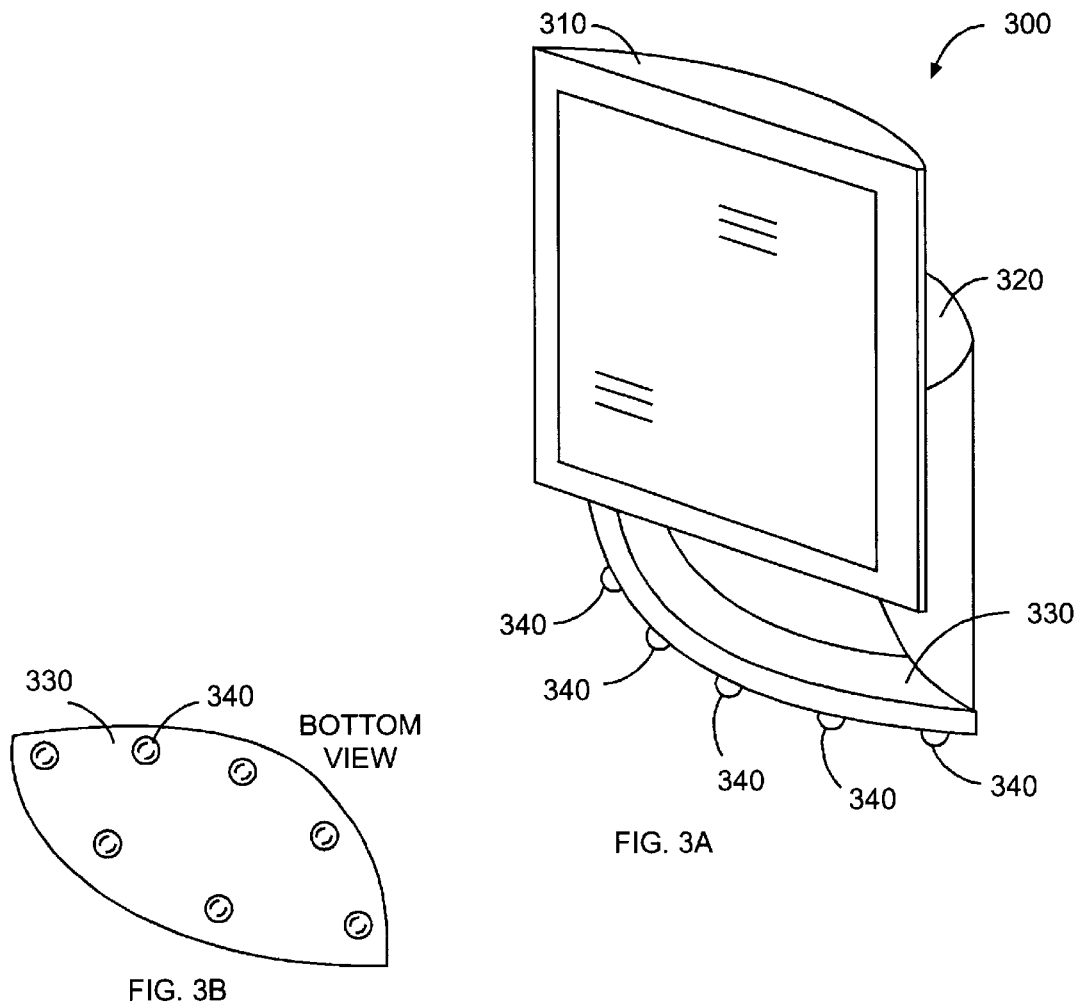
FIG. 3A
FIG. 3B
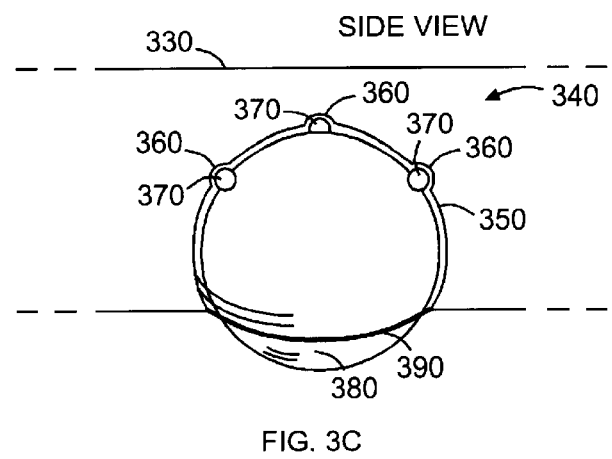
FIG. 3C

FRONT VIEW

BOTTOM VIEW

APPARATUS FOR PROVIDING DESKTOP MOBILITY FOR DESKTOP ELECTRONIC DEVICES

RELATED APPLICATIONS

This application is a continuation-in-part (CIP) claiming priority to U.S. patent application Ser. No. 09/503,066 filed on Feb. 12, 2000, and issued as U.S. Pat. No. No. 6,367,748 on Apr. 9, 2002, the entire teaching of which are incorporated herein by reference.

BACKGROUND OF THE PRESENT INVENTION

Desktop electronic devices, such as computers, computer monitors, keyboards, or multi-component units, have become necessary in places of employment and a convenience at home. The desktop electronic devices have made workforces around the world more efficient and productive. However, as desktop electronic devices have become an essential tool to office workers or deskworkers, premium desktop space has been sacrificed to support the desktop electronic devices.

A problem that has arisen due to the desktop electronic devices requiring desktop space is that the deskworker has difficulty finding available desktop space to perform traditional paperwork duties. To accommodate space for the desktop electronic devices and the traditional paperwork duties, businesses have had to resort to purchasing additional furniture for the deskworkers, including tables, desks, and chairs. The additional furniture is costly and, more important, requires additional office space for each deskworker.

Typically, the desktop electronic device resides directly on the desk, which is the most physically convenient location for the deskworker to use for operating the desktop electronic device. If the deskworker has a single desktop, then the deskworker has two alternatives to perform traditional paperwork duties: (i) either sit uncomfortably to perform paperwork duties around the desktop electronic device, or (ii) physically pick up or slide the desktop electronic device across the workspace to make usable space available. A deskworker who sits uncomfortably for long periods of time can expect physical ailments, and a deskworker who physically lifts or slides the desktop electronic device may eventually experience physical injury. Furthermore, sliding the desktop electronic device across the desktop on the base of the desktop electronic device can scratch or damage the desktop and/or damage the desktop electronic device.

Alternatively, businesses may purchase other mechanisms for the desktop electronic devices to be supported above the desktop. FIG. 1 shows a desktop electronic device 100 supported above a desk 110 by a swing arm 120. The swing arm 120 allows the desktop electronic device 100 to be moved out of the deskworker's way without lifting or sliding the device. The swing arm 120, however, is relatively bulky, heavy, and expensive for supporting the weight of the desktop electronic device 100. Less appealing is the requirement that the swing arm 120 be fixedly attached to the desk 110, potentially damaging or scratching the desk 110. Similar problems exist at a home of an individual who owns a desktop electronic device.

SUMMARY OF THE INVENTION

To overcome the problems associated with traditional desktop electronic devices (i) being difficult to move on a desktop and (ii) using expensive, bulky swing arm mechanisms, the principles of the present invention provide desktop mobility for a desktop electronic device by at least one mobility assembly. The mobility assembly(s) allow the deskworker to roll the desktop electronic device to an out-of-the-way location on the desktop so that the deskworker can perform his or her paperwork duties. The mobility assembly(s) may be connected to or integrated with the desktop electronic device during manufacturing as original equipment of manufacture (OEM). A mobility assembly may include at least one primary revolving member and at least one secondary revolving member in contact therewith. The revolving members may being shaped as a sphere or cylinder. To grip and reduce scratching the desktop, the revolving member(s) that touch the desktop are optionally coated or are made of a solid material, such as rubber. Additionally, various braking mechanisms may be selectably applied to restrict movement of the desktop electronic device.

Alternatively, at least one mobility assembly may be connected to a separate platform used to support and provide desktop mobility to the desktop electronic device. The platform optionally includes means for securing the desktop electronic device to the platform to reduce risk of the desktop electronic device from falling off the platform during movement. The mobility assembly(s) may be engaged and disengaged from the desktop for both the separate platform and device integrated OEM designs.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3A is a schematic diagram of a desktop electronic device of FIG. 2 having a flat panel display connected directly to a computing device having at least one mobility assembly incorporated in a housing or base of the computing device;

FIG. 3B is an illustration of the base of the computing device of FIG. 3A;

FIG. 3C is a schematic diagram of the mobility assembly utilized in the desktop electronic device of FIG. 3A;

DETAILED DESCRIPTION OF THE DRAWINGS

The present invention will now be described more filly hereinafter with reference to the accompanying drawings, in which preferred embodiments of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Deskworkers who use desktop electronic devices, such as computers, find that their desktops are consumed by desktop electronic devices, leaving little desktop space for traditional paperwork duties. While computer manufacturers have begun to combat the desktop space issue by producing computers with flat panel displays, the deskworker still faces the problem of having to work around the desktop electronic device that is, typically and desirably, located in the center of the desktop while being used. The present invention addresses this same desktop space issue, but from the standpoint of facilitating movement of the desktop electronic device, and does so by coupling at least one mobility assembly to the desktop electronic device. With the aid of the mobility assembly, the deskworker has an easy way to roll the desktop electronic device to an end or back of the desktop. Thus, the deskworker re-gains valuable desktop space to perform paperwork without lifting or damaging the desktop electronic device(s). Additionally, the need for an employer to purchase additional desks for deskworkers is reduced due to the ease in moving the desktop electronic devices across the desktop, which effectively provides for additional desktop space.

Figure 1:
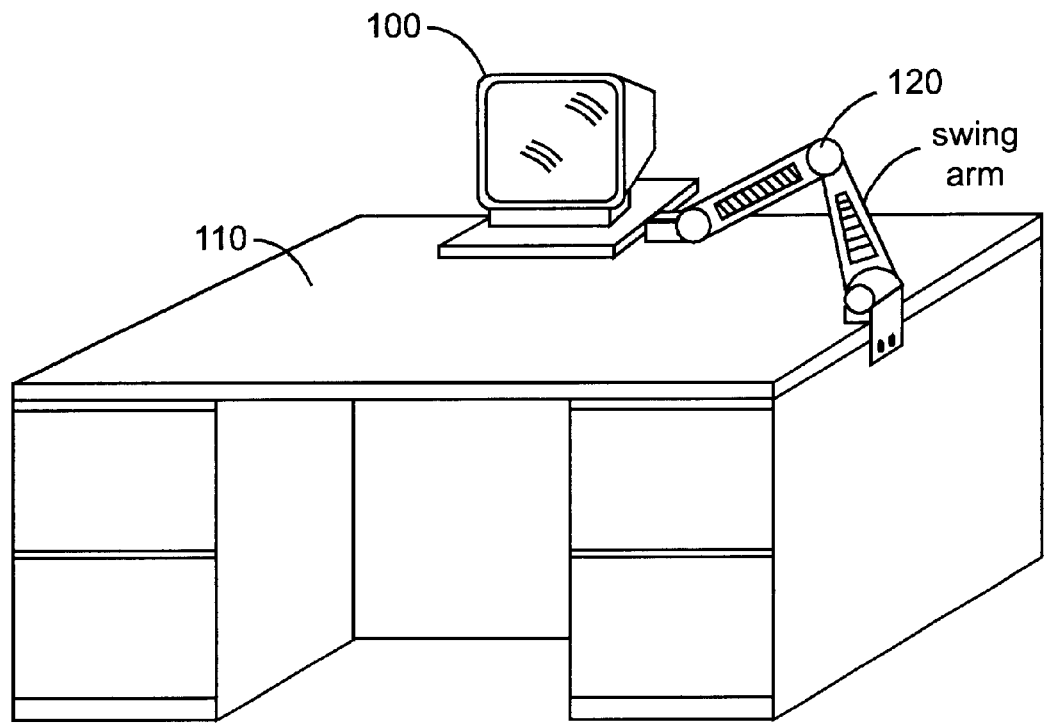
FIG. 1 is an illustration of a representative workspace for a deskworker having a desktop electronic device mounted on a prior art swing arm unit, as previously described.
Figure 2:
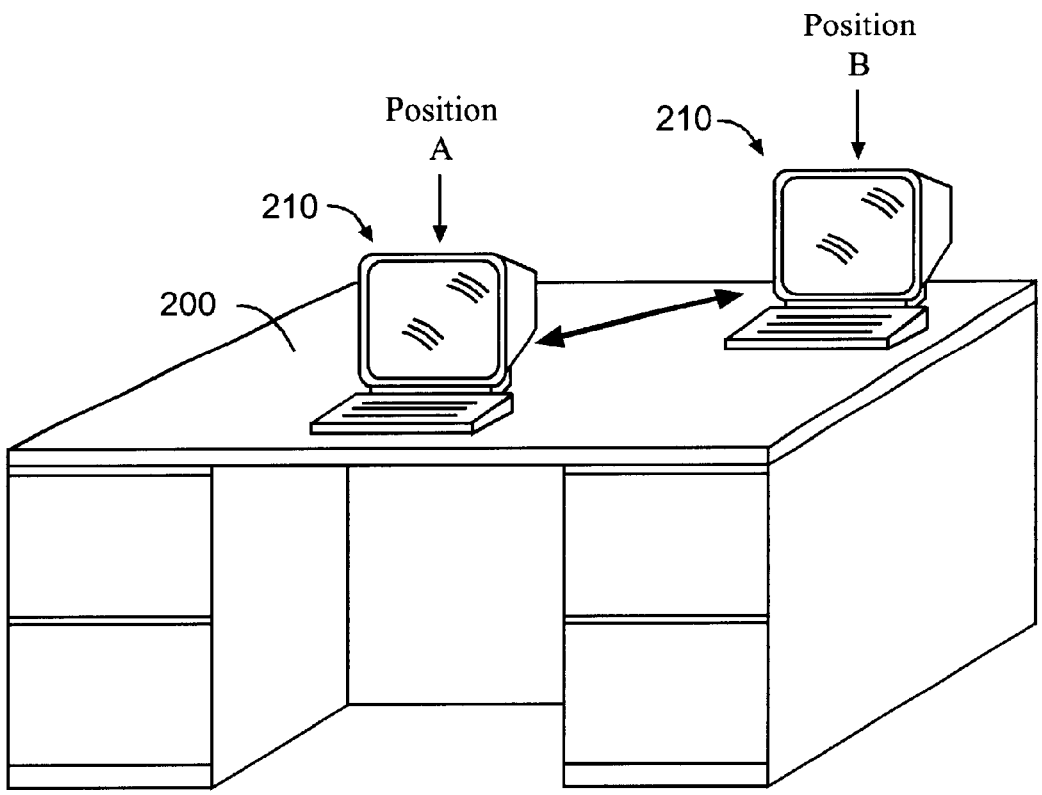
FIG. 2 is an illustration of a representative workspace for a deskworker indicating usage and non-usage desktop locations for the desktop electronic device.

FIG. 2 is a typical desktop 200 work environment. Typically, the deskworker positions the desktop electronic devices 210, here a computer chassis with a computer monitor positioned on the computer chassis, at Position A. Though convenient for computer-related tasks, when in Position A, the desktop electronic device 210 is inconvenient for performing traditional paperwork tasks. The deskworker translates the desktop electronic device 210 across the desktop to Position B. The deskworker would benefit greatly if the desktop electronic device 210 could be easily moved into an out-of-the-way position on the desktop 200, such as is shown with the desktop electronic device 210 in Position B.

The present invention provides the deskworker with a simple, low-profile, small-footprint, non-desk altering solution to easily move the desktop electronic devices about the desktop, for example, from front-center (Position A) to far-right (Position B). Of course, the present invention is adaptable to other electronic desktop devices, such as portable computers, stereos, adding machines, cash registers, televisions, home appliances, consumer electronics, etc. Since desktop computers are most common in a typical desktop work environment, it is used here as the example desktop electronic device.

FIG. 3A depicts a specific type of desktop electronic device, commonly known as an integrated computer 300. The desktop electronic device 300 incorporates a flat panel display 310, housing 320 and base 330 into a single form. The flat panel display 310 is coupled to the housing 320, which contains the computer electronics. The housing 320 is supported by the base 330. It should be understood that the base 330 may be the bottom surface of the housing 320. The desktop electronic device 300 (i.e., integrated computer) is manufactured with the flat panel display so as to reduce size, weight, and footprint. Even so, however, as with traditional, non-integrated computers and display monitors (see, for example, the computer 210, FIG. 2), the deskworker preferably positions the desktop electronic device 300 directly in the front and center of the desktop, thereby resulting in the same problem of not having desktop space or having to move the desktop electronic device 300 to perform traditional paperwork duties.

Because the desktop electronic device 300 is smaller and lighter than traditional desktop electronic devices having larger monitors (e.g., 210), the deskworker can more easily slide the desktop electronic device 300 on its base 330 across the desktop or pick up the desktop electronic device 300 and place it out of the way (i.e., on another location on the desktop). However, each of these options subjects the desktop and desktop electronic device 300 to damage, and the deskworker to injury To reduce risk of damage and injury, mobility assemblies 340 are connected to the base 330 of the desktop electronic device 300. These mobility assemblies 340 support and provide mobility for the desktop electronic device 300.

It should be understood that the mobility assemblies 340 solve the above problems for moving the desktop electronic device and provide the following benefits. First, the desktop electronic device can be rolled rather than slid across the desktop, preventing damage to the desktop and reducing the likelihood of tipping the desktop electronic device. Second, the deskworker does not have to lift the desktop electronic device, thus avoiding risk of physical injury to the deskworker. Third, the desktop electronic device is protected from being dropped or jarred during operation.

FIG. 3B shows a bottom view of the base 330 of the desktop electronic device 300. Shown connected to the base 330 are a plurality of mobility assemblies 340. These mobility assemblies 340, as shown, are integrally manufactured within the base 330 so as to be original equipment of manufacture (OEM). A manufacturer of desktop electronic devices 300 that integrates the mobility assemblies 340 directly into the base removes the need for later assembly by the deskworker. It should be understood that the number of mobility assemblies 340 shown are merely representative of one embodiment, and that as few as one and as many as desired could be implemented. Additionally, each mobility assembly 340 includes at least one revolving element, where the size and shape of the revolving element can vary. The shapes may include at least spherically and cylindrically revolving elements. Also, cylindrically shaped wheels mounted on castors (not shown), as is well known in the art, could be used to move the desktop electronic device multi-directionally.

FIG. 3C shows a side view of the mobility assembly 340 according to the present invention. As shown, the base 330, which could also be a separate platform as is further described in reference to FIG. 8, houses the mobility assembly 340. In one embodiment, the base 330 comprises a first or primary cavity 350, which is spherically shaped, and three secondary cavities 360, also defining spherical shapes. The secondary cavities 360 each have an opening so that a secondary revolving element 370 deployed in a secondary cavity 360 touches a first or primary revolving element 380, deployed in the primary cavity 350.

The primary cavity 350 has an opening at the bottom of the base 330 so that the primary revolving element 380 can touch the desktop, thereby supporting the flat surface of the base 330 off the desktop. The extent to which the primary revolving element 380 extends below the opening at the bottom of the base 330 may be dependent upon the weight of the desktop electronic device or simply for aesthetic purposes. The primary revolving element 380 is preferably larger than the three secondary revolving elements 370, but may be smaller or the same size. The three secondary revolving elements 370 may be positioned 60 degrees apart from one another and above the "equator" of the primary revolving element 380. Alternatively, more than three secondary revolving elements 370 are configured around the primary revolving element 380, possibly at random locations in the primary cavity 350 and possibly in one or more secondary cavities 360 that support more than just one secondary revolving element 370. Another embodiment employs secondary cylinders, rather than secondary spheres, to contact the primary revolving element 380. The cylinders may reside in a cylindrical cavity or be mounted on support pins.

By configuring the primary revolving element 380 to press against the three secondary revolving elements 370 that are housed in their own secondary cavities 360, the primary revolving element 380 is free to rotate any number of degrees in any direction with very little resistance. This is so because the primary revolving element 380 does not contact the primary cavity 350 wall; it is kept a small distance from the wall by the secondary revolving elements 370.

So that the primary revolving element 380 grips desktop well and reduces likelihood of scratching the desktop, the composition of the primary revolving element 380 may comprise an outer layer of rubber, be formed of solid rubber, or be made of other soft material relative to a desktop, while having a reasonable coefficient of restitution to prevent deformation over time. Other materials capable of providing gripping without scratching for the primary revolving element 380 and allowing the primary revolving element 380 to revolve with little resistance by the three secondary revolving elements 370 are suitable to be used. Additionally, so that the primary revolving element 380 is able to freely rotate, the composition of the outer layer of three secondary revolving elements 370 may be Teflon as is each secondary cavity 350 wall so as to provide a low coefficient of friction so that each secondary revolving element 370 is more easily able to rotate within each secondary cavity 350. Other material having a very low coefficient of resistance, such as metal or plastic, could also be used. However, the high coefficient of friction of the primary revolving element provides enough friction with the secondary revolving elements 370 (and the desktop) to allow the primary revolving element 380 and secondary revolving elements 370 to revolve in their respective cavities 350, 360. Note that the revolving of the secondary revolving elements 370 is optional as limited contact between the primary 380 and secondary 370 revolving elements allows the mobility assembly 340 to provide desktop mobility to the desktop electronic device 300.

A retainer ring 390 connected to the base 330 by a screw design (not shown) or other retaining method, such as a latching mechanism, prevents the revolving elements 370 and 380 from falling out of the primary cavity 350 when lifted from the desktop. The retainer ring 390 is removable to allow the deskworker to access to the mobility assembly 340 to repair damaged or dirty revolving elements 370, 380 or cavities 350, 360.

It should be understood that the mobility assembly 340 can be configured differently from the embodiment described to secure to other, electronic or non-electronic, devices. Additionally, the mobility assembly 340 and its components can be scaled to be any size (i.e., larger or smaller) so as to be properly sized to support the device to which the mobility assembly 340 is attached.

Figure 4:
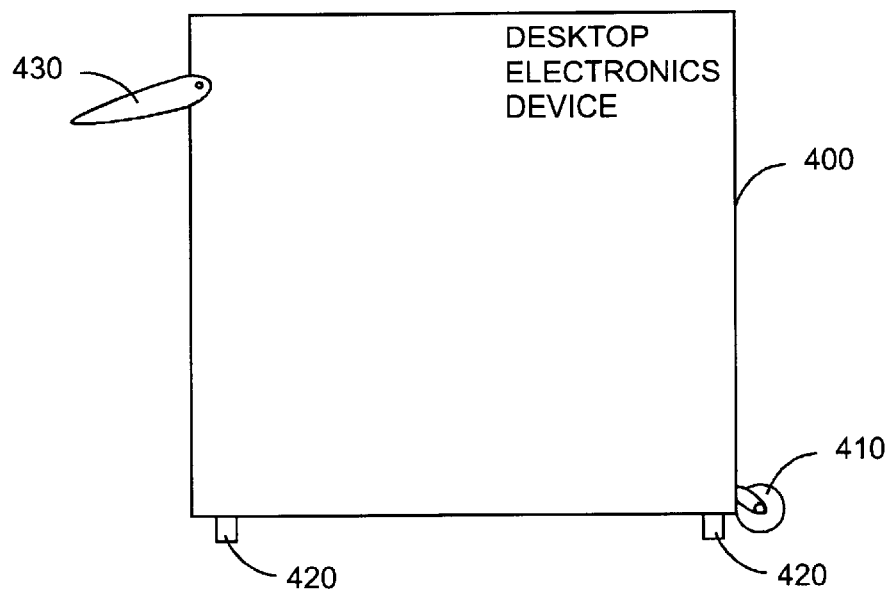
FIG. 4 is a schematic diagram of an alternative embodiment of the mobility assembly of FIG. 3C coupled to a desktop electronic device.

FIG. 4 is an illustration of another embodiment of the present invention. In this embodiment, at least one mobility assembly 410 is coupled to a desktop electronic device 400. However, unlike the previous embodiments, a plurality of feet 420 support the desktop electronic device 400 while the desktop electronic device 400 is not being translated across the desktop on the mobility assembly 410 by the deskworker. The deskworker may utilize a handle 430 to tilt the desktop electronic device 400 onto the mobility assembly(s) 410 and roll the desktop electronic device 400 across the desktop. The mobility assembly(s) 410 comprise at least one revolving element that may be a cylinder, sphere, or tire-shaped. The mobility assembly(s) 410 may be connected to the desktop electronic device 400, as shown, or higher up on the side. Note that this configuration is not as gentle as the configuration shown in FIG. 3A for the desktop electronic device 400 or as safe for the deskworker during movement of the desktop electronic device. In an alternative embodiment, a plurality of mobility assemblies 410 are coupled to the desktop electronic device 400 and support it even while at rest.

Figure 5A:
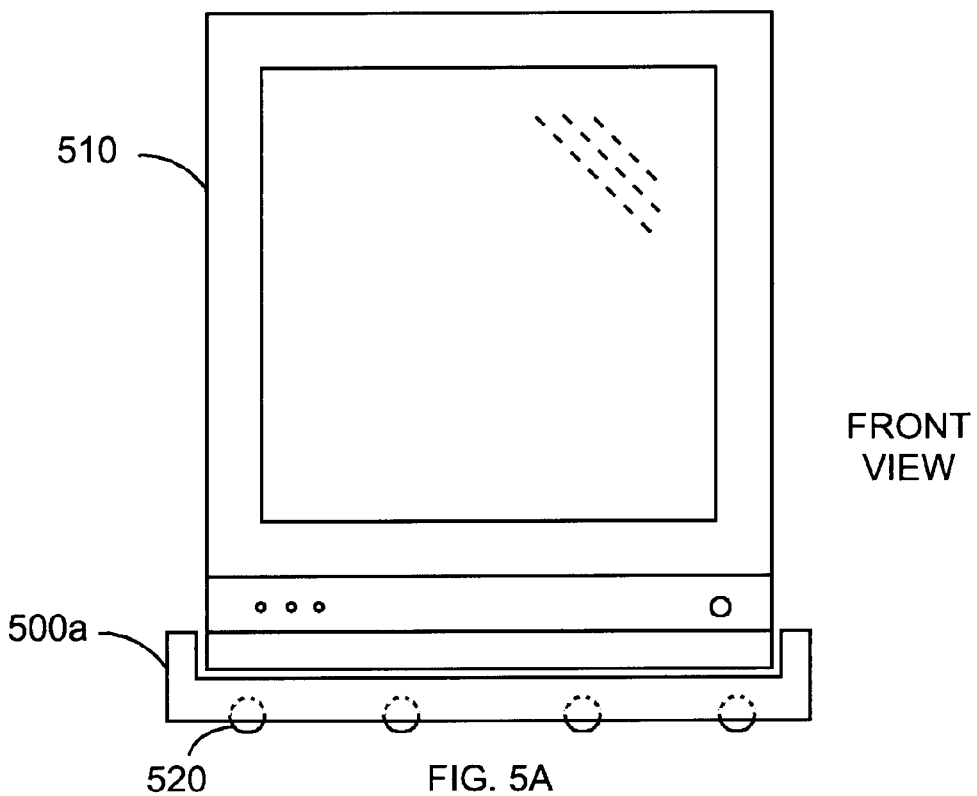
FIG. 5A is a schematic diagram of an apparatus comprising plural mobility assemblies of FIG. 3C that may be employed in FIG. 2.

FIG. 5A shows a front view of another embodiment of the present invention. An apparatus or platform 500a, separate from the desktop electronic device 510, comprises mobility assemblies 520. The platform 500a is designed to be separate from the desktop electronic device 510 (i.e., not part of an originally manufactured desktop electronic device 510). The platform 500*a* can be shaped to "form-fit" the base of a desktop electronic device 510, as shown, or can be sized, more generically, to support a desktop electronic device over a wide range of sizes and shapes. Though the mobility assemblies 520 are shown to be coupled to the bottom of the platform 500*a*, it should be understood that the embodiment of FIG. 4 could alternatively be employed.

Figure 5B:
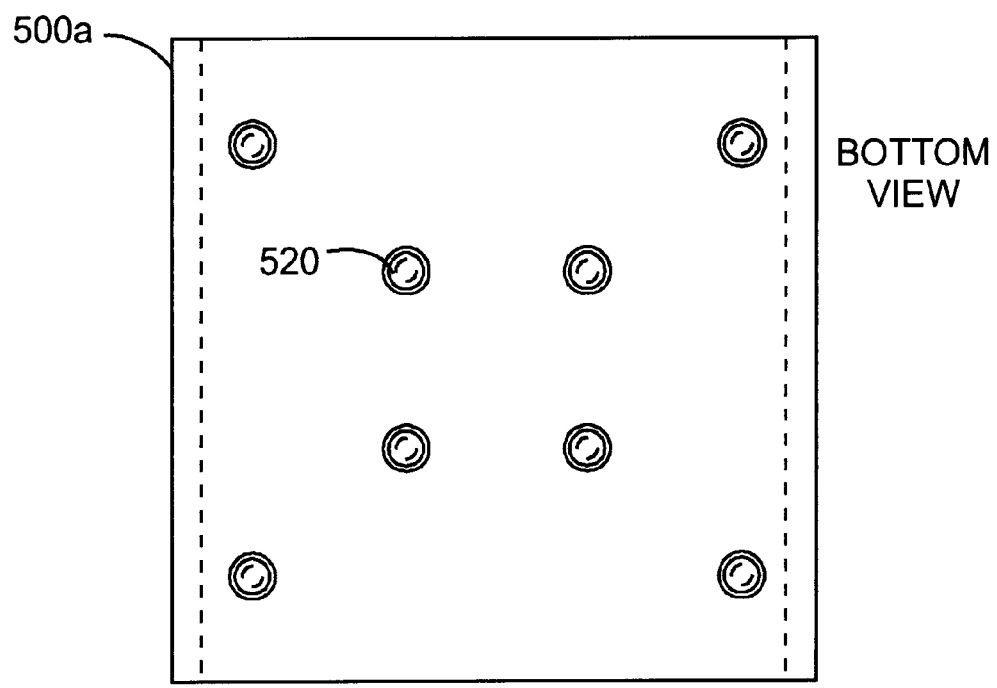
FIG. 5B is a bottom view, pictorial diagram of the apparatus of FIG. 5A.

FIG. 5B shows a bottom view of the platform 500*a* having a plurality of mobility assemblies 520 connected to the platform 500*a* according to the principles of the present invention. The platform 500*a*, having the mobility assemblies 520, may be connected to the bottom of the desktop electronic device 510. Although separate from the desktop electronic device 510, the platform 500*a* provides the same functionality (of providing desktop mobility for the desktop electronic device 510) as the embodiment with the mobility assemblies 520 being connected directly to the desktop electronic device 510 (see, for example, FIG. 3A).

Figure 6:
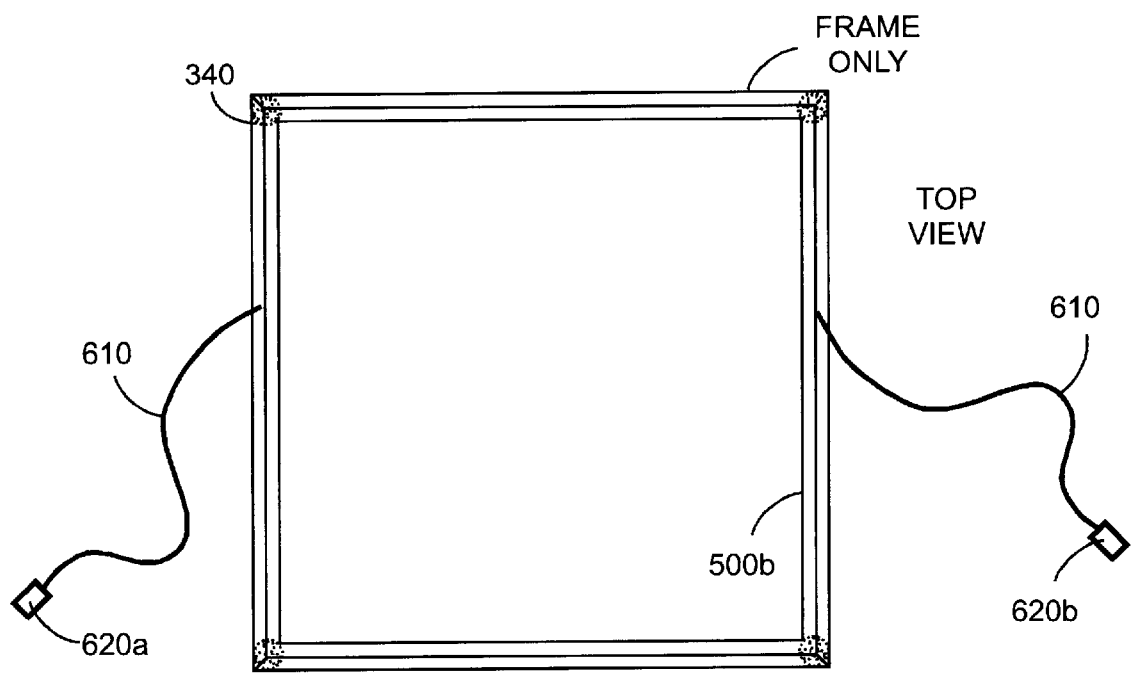
FIG. 6 is a schematic diagram of an alternative embodiment of the apparatus of FIG. 5A.

FIG. 6 is a top view of another embodiment of the present invention in which a platform 500*b* has only a frame (i.e., the center of the frame is empty, therefore lighter and less expensive to manufacture). The platform 500*b*, may form-fit the base or footprint of a desktop electronic device. To prevent the desktop electronic device from falling off the platform 500*b* during a move, the platform 500*b* may include straps 610. On a first end, each strap 610 is coupled to the platform 500*b*; on a second end, each strap 610 includes clips 620*a* and 620*b*, where the clips 620*a* and 620*b* may be designed to be connected together or may be designed to couple the platform or just the desktop electronic device. The straps 610 may be stretchable or non-stretchable. Alternatively, a material such as foam rubber or Velcro® may be employed to improve the coupling between the desktop electronic device and the platform 500*b*. The material is attached (not shown) to locations on the platform 600*b* where the desktop electronic device contacts the platform. In the case of a two-part material, such as Velcro®, one part is attached to the platform 500*b* and the second part is attached to the desktop electronic device. Alternatively, other securing mechanisms may be used to secure the desktop electronic device to the platform 500*b*, including screws, gaskets, clamps, pins, and snaps.

Figure 7:
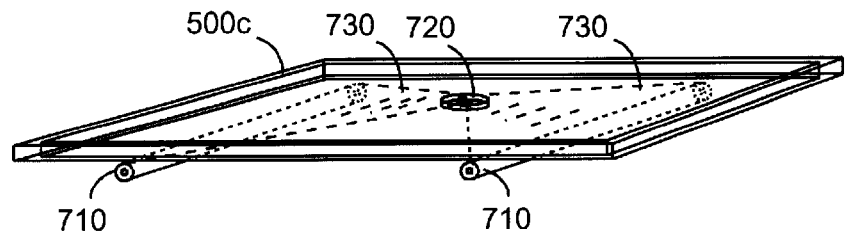
FIG. 7 is a schematic diagram of an embodiment of yet another embodiment of the apparatus of FIG. 5A having cylindrical rollers for single axis translation.

FIG. 7 is a schematic diagram of an alternative embodiment of the platform 500*c*. The two rollers 710 are connected to the platform 500*c* via a swivel 720, which allows the platform 500*c* to rotate. The rollers 710 allow the platform 500*c* to be moved in a linear manner across the desktop. It should be understood that the number of rollers 710 coupled to the platform 500*c* can range from one to as many as can reasonably fit across the bottom of the platform 500*c*. Additionally, an arm or flange (not shown) may be connected to at least one of the connecting components 730 connected to the rollers 710 to provide a handle to allow a user to rotate the platform 500*c* beneath the desktop electronic device. The translation movement of the platform 500*c* is more limited by utilizing the two, parallel rollers 710 in parallel configuration than the mobility assembly 340 configuration (see, for example, FIG. 3C).

Figure 8:
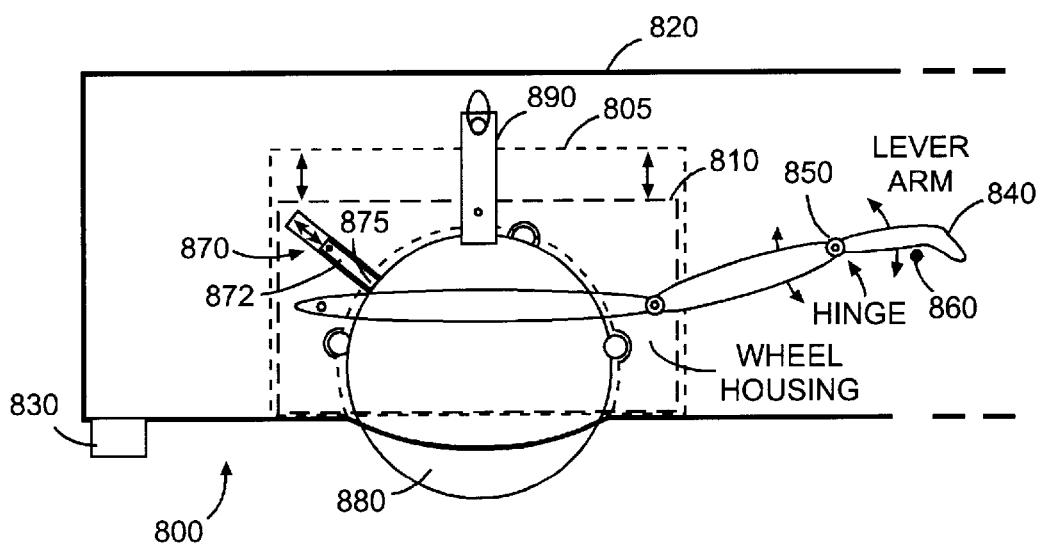
FIG. 8 is a schematic diagram of another embodiment of the mobility assembly of FIG. 3C having a mechanism for disengaging the mobility assembly from the desktop.

FIG. 8 is a schematic diagram of an alternative embodiment of a mobility assembly 800. A platform 820 defines a slot 805 into which a housing 810 composing part of the mobility assembly 800 resides. The housing 810 is separate from the platform 820 so that the mobility assembly 800 can be engaged and disengaged (i.e., set to support the desktop electronic device on the desktop or recessed from the desktop) so that the desktop electronic device can be supported by feet 830. Disengaging the mobility assembly 800 eliminates the possibility for the desktop electronic device to roll off the desktop by incidental contact.

To engage and disengage the mobility assembly 800 to/from supporting the desktop electronic device, a deskworker operates a lever arm 840. The lever arm 840 is coupled to the housing 810 of the mobility assembly 800. The lever arm 840 rotates about a hinge 850. A peg 860 fixedly coupled to the platform 820 secures the lever arm 840 in either the engaged or disengaged position. A spring-clip latching mechanism 890 may also be used to lock the mobility assembly in the disengaged position. It should be understood that other engaging and disengaging mechanisms may be used to toggle between having the feet 850 or the mobility assembly 800 support the desktop electronic device.

Additionally, the feet 850 may have an engaging or disengaging mechanism to lower and raise the feet to support the desktop electronic device on the platform. Alternatively, an electro-mechanical device (not shown), such as a worm gear coupled to a motor, may be used to engage and disengage the mobility assembly 800 or the feet 850; a simple hand-activated screw mechanism may be used in place of the motor-worm gear mechanism. Yet another embodiment includes stopper arms having rubber tipped ends (not shown) that press against the desktop with enough force to provide resistance for the desktop electronic device to be prevented from being moved by incidental contact by the deskworker. Finally, a locking mechanism 870 may include a peg 872 having a rubber tip 875 that can be selectively applied to a primary revolving member 880 so that the platform 820 is prevented from moving due to incidental contact by the deskworker.

It should be understood that an engaging or disengaging mechanism for the mobility assembly 800 or feet 850 could also be applied to the desktop electronic device by the desktop electronic device manufacturer. A shock absorption mechanism (not shown), such as springs or dashpots, may also be included between the mobility assembly 800 and the platform 820 so as to provide additional protection for the desktop electronic device during movement.

Figure 9:
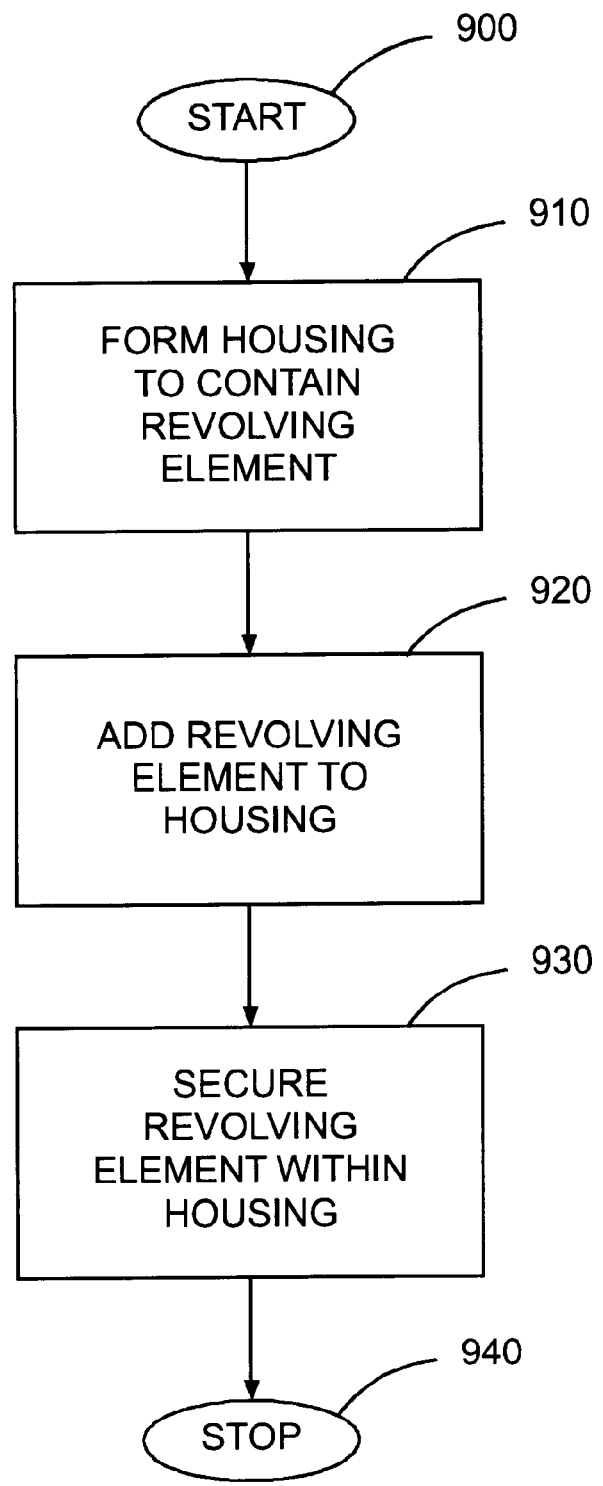
FIG. 9 is a representative flow diagram of a method for forming the mobility assembly apparatus of FIG. 3C.

FIG. 9 is a flow diagram of a method for forming a revolving member according to the principles of the present invention. The method starts in step 900. In step 910, a housing (e.g., 340 or 810) to contain revolving elements (e.g., 370 and 380) is formed. The housing may be formed through plastic molding or die casting techniques, for example. The revolving elements, which may comprise several spherical and/or cylindrical elements, are added to the housing formed in step 920. In step 930, the revolving elements are secured within the housing. For example, a retainer ring maybe secured using a technique as herein previously described. Once the revolving elements are secured in step 930, the method is completed in step 940.

Figure 10A:
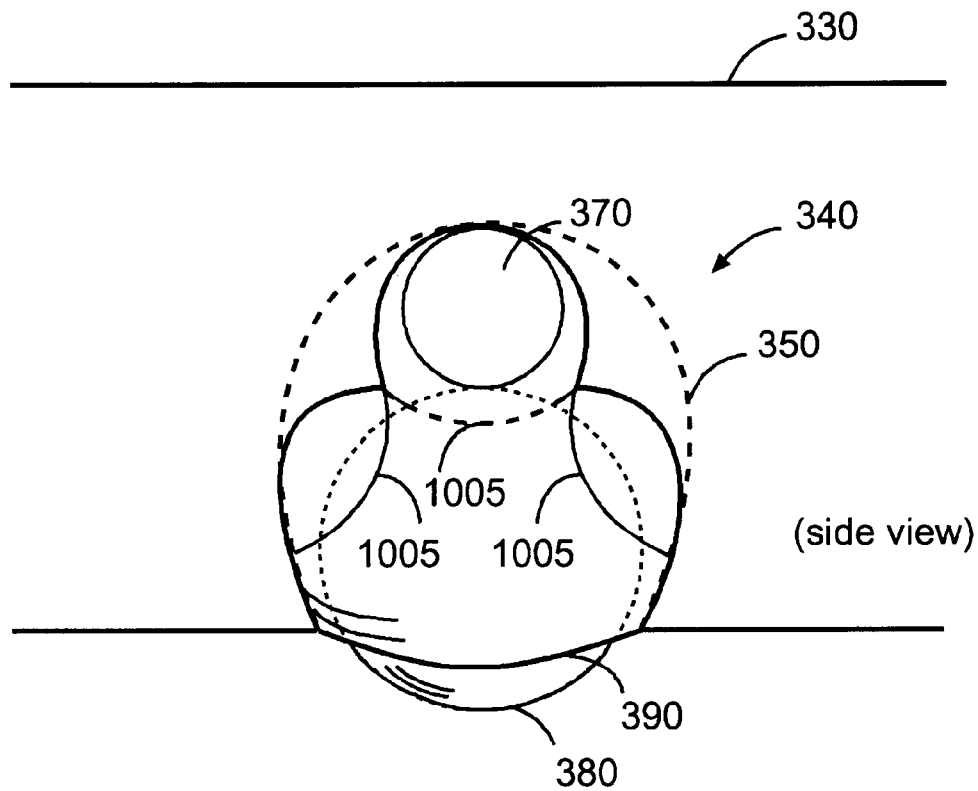
FIG. 10A is a side view of an alternative embodiment of the mobility assembly of FIG. 3A having a primary revolving member and a single secondary revolving member.

FIG. 10A is a side view of an alternative embodiment of the mobility assembly 340. In this embodiment, rather than having a primary revolving element and at least three secondary revolving elements, the mobility assembly 340 has a primary revolving element 380 and a single, secondary revolving element 370. As shown, the primary cavity 350 of the base 330 encompasses both the primary and secondary revolving elements 380 and 370, respectively. Alternatively, a secondary cavity 360 may also be defined in the base 330 to maintain the position of the secondary revolving element 370 in a more definite manner than having just the primary cavity 350. Further yet, guides (not shown) may be molded into or fixedly attached in the primary cavity 350 to maintain the position of the secondary revolving element 370.

Three support members 1005 are extended into the primary cavity 350 to provide support for the primary revolving element 380. By having three support members 1005, preferably at 60 degree spacings about the primary revolving element 380, friction is reduced compared to a primary cavity 350 without the support members 1005. It should be understood that fewer or more than three support members 1005 may be utilized. The support members 1005 may be plastic or other material providing a low coefficient of friction with the primary revolving element 380 to allow the primary revolving element 380 to rotate easily and smoothly.

Figure 10B:
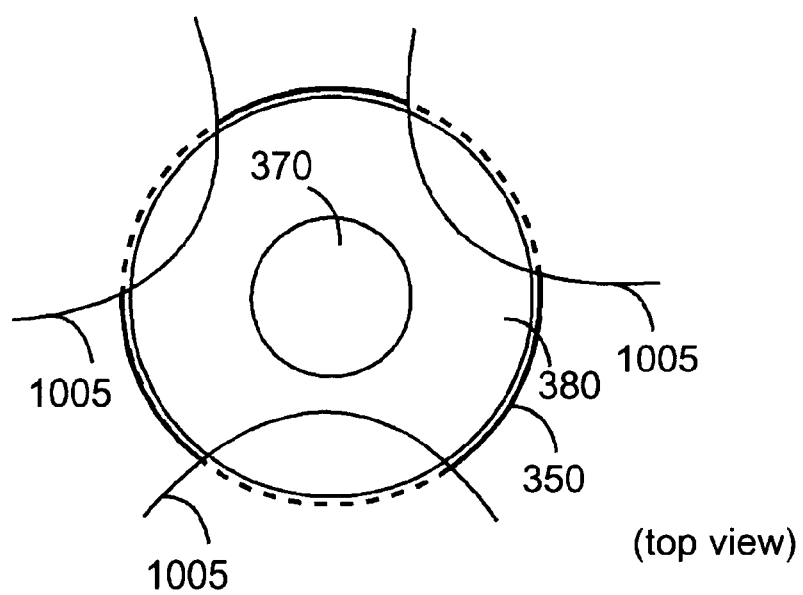
FIG. 10B is a top view of the mobility assembly of FIG. 10A.

FIG. 10B is a top view of the mobility assembly 340 of FIG. 10A. The three support members 1005 are shown to be above the "equator" of the primary revolving element 380 to resist the upward force of the primary revolving member 380 due to contact with the desktop 200. The secondary revolving element 370 is located substantially directly above the primary revolving element 380 to assist in the revolving motion of the primary revolving element 380. Alternatively, two or more secondary revolving elements 370 may be employed to assist further in the revolving motion of the primary revolving element 380.

Figure 11A:
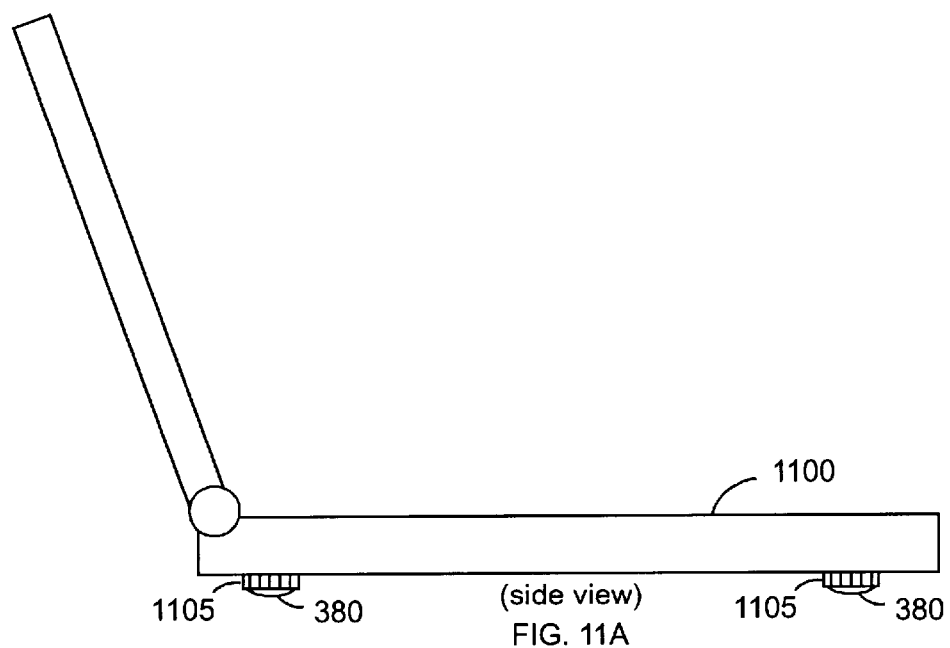
FIG. 11A is a side view of a portable computer having the mobility assembly of FIG. 10A including a rotatable locking mechanism.

FIG. 11A is a side view of the desktop electronic device 210 having rotatable locking mechanisms 1105 for locking the primary revolving elements 380. Each rotatable locking mechanism 1105 is coupled to the bottom surface of the desktop electronic device 210 via a threaded screw connection for example. The rotatable locking mechanism 1105 may be rotated (i.e., screwed) to adjust an amount of friction being applied directly or indirectly to the revolving element 380.

Figure 11B:
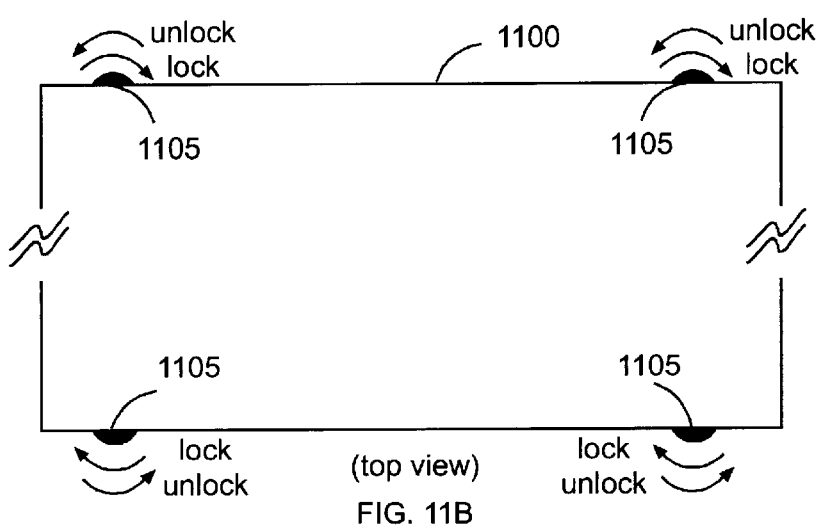
FIG. 11B is a top view of the portable computer of FIG. 11A having the rotatable locking mechanism.

FIG. 11B is a top view of the desktop electronic device 210 having the rotatable locking mechanisms 1105 extending beyond the side of the desktop electronic device 210. Alternatively, the rotatable locking mechanisms 1105 are aligned with the side of the desktop electronic device 210 so as not to add extra width to the desktop electronic device 210.

As indicated, each of the rotatable locking mechanisms 1105 may be rotated clockwise and counterclockwise to lock and unlock the associated primary revolving elements 380. Although the rotatable locking mechanisms 1105 are shown as a wheel, alternative embodiments include a lever, slide, or other mechanical element to lock and unlock the associated primary revolving elements 380.

Figure 11C:
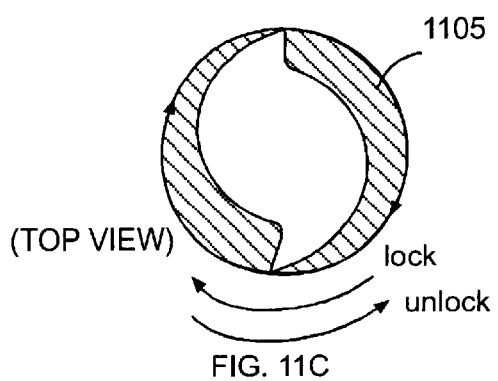
FIG. 11C is a top view of an embodiment of the rotatable locking mechanism of FIG. 11A.

FIG. 11C is atop view of an embodiment of the rotatable locking mechanism 1105 of FIG. 11A. The rotatable locking mechanism 1105 has an inner surface 1110 that radially reduces the cavity it encircles when the rotatable locking mechanism 1105 is rotated in a clockwise direction.

In operation, when the rotatable locking mechanism 1105 is rotated from an unlock to a lock position, the inner surface 1110 compresses a flexible wall defining the primary cavity 350 that houses the revolving element 380. In this embodiment, the exterior surface of the flexible wall has a shape substantially inversely matching the inner surface 1110 of the rotatable locking mechanism 1105 to facilitate the locking and unlocking actions. Alternatively, the inner surface 1110 contacts the primary revolving element 380 directly.

Figure 11D:
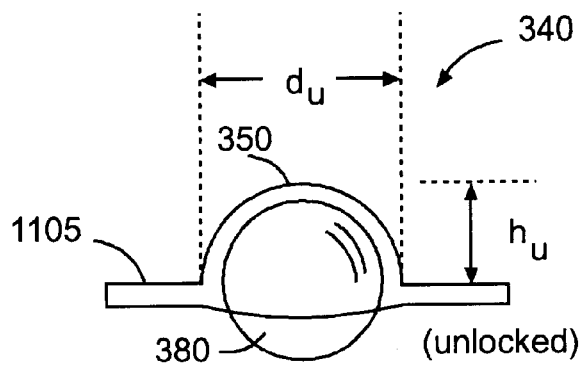
FIG. 11D is a diagram of an exemplary embodiment of a mobility assembly having a flexible cavity operated by the rotatable locking mechanism of FIG. 11C, the mobility assembly as shown is in an unlocked state.

FIG. 11D is a diagram of the mobility assembly 340 having an exemplary flexible cavity wall, deformed by the rotatable locking mechanism 1105 of FIG. 11C, defining the primary cavity 350. In the unlocked state, the primary cavity 350, defined by the flexible cavity wall, has a height $h_u$ and diameter $d_u$ that allows the primary revolving element 380 to rotate freely within the primary cavity 350.

Figure 11E:
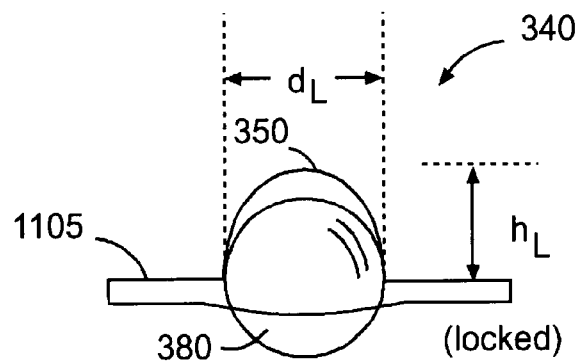
FIG. 11E is a diagram of the mobility assembly of FIG. 11D in a locked state.

FIG. 11E is a diagram of the mobility assembly 340 of FIG. 11D in a locked state. The mobility assembly 340 has the rotatable locking mechanism 1105 in a locked state. In the locked state, the primary cavity 350 has a height $h_L$ and diameter $d_L$ that restricts the revolving element 380 from freely rotating within the primary cavity 350. Note that $h_L > h_u$ and $d_L < d_u$ In operation, the rotatable locking mechanism 1105 is rotated by a user to cause the inner surface 1110 (FIG. 11C) of the rotatable locking mechanism 1105 to deform (e.g., compress) the primary cavity 350, thereby asserting the locked position (i.e., applying increased friction to the revolving element 380). Another embodiment of the rotatable locking mechanism 1105 causes the rotatable locking mechanism 1105 to clamp or compress the revolving element 380 between the rotatable locking mechanism 1105 and the wall of the primary cavity 350 to prevent the primary revolving element 380 from revolving within the cavity 350.

In yet another embodiment, the rotatable locking mechanism 1105 does not rotate, but instead is moved downward into a detent position; the inner surface 1110 and matching surface on the exterior surface of the flexible wall defining the primary cavity 350 are reconfigured to support this embodiment. In still a further embodiment, the rotatable locking mechanism 1105 is operated by a DC motor integrated as a peripheral to the desktop electronic device 210 (FIG. 2). Although shown with the mobility assembly 340 having only the primary revolving element 380, it should be understood that the various embodiments of the rotatable locking mechanism 1105 can be applied to mobility assemblies having at least one secondary revolving element 370.

Figure 12A:
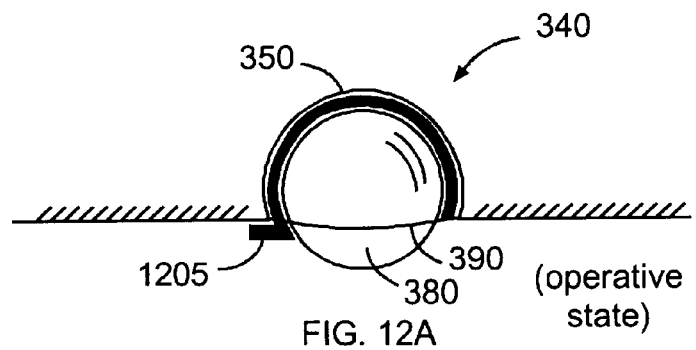
FIG. 12A is side view of the mobility assembly of FIG. 3A having an "eyelid" disabling mechanism in a concealed position.
Figure 12B:
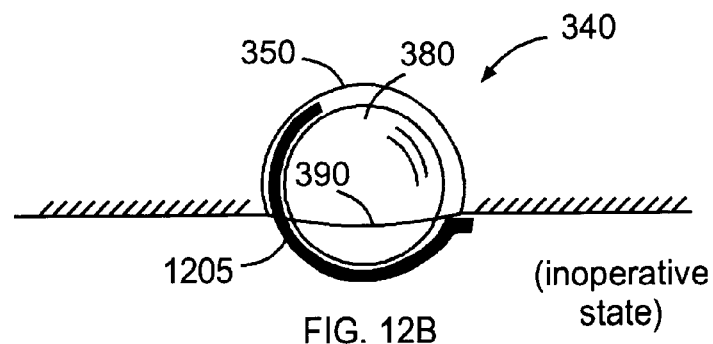
FIG. 12B is a diagram of the mobility assembly of FIG. 12A having the eyelid disabling mechanism in a revealed position.

FIGS. 12A and 12B are illustrations of the mobility assembly 340 having an alternative of a resistance style braking mechanism. In this embodiment, an "eyelid" cover 1205 enables and disables the mobility assembly 340 by selectably allowing for engagement and disengagement of the primary revolving element 380 to and from the desktop 200 (FIG. 2).

FIG. 12A is an exemplary embodiment of a mobility assembly 340 according to FIG. 3A having an "eyelid" cover 1205 in a concealed position such that the mobility assembly 340 is in an operative state. The operative state allows the revolving element 380 to engage the desktop. In the concealed position, the eyelid cover 1205 is inside an associated eyelid cavity 1210.

FIG. 12B is a diagram of the mobility assembly 340 of FIG. 12A having the eyelid cover 1205 in a revealed position. In the revealed position, the eyelid cover 1205 puts the mobility assembly 340 in an inoperative state. As shown, the eyelid cover 1205 is located below the primary revolving element 380. The inoperative state prevents the revolving element 380 from engaging the desktop. In the revealed position, the eyelid cavity 1210 is empty.

The eyelid cover 1205 may have a flat or other shaped surface, where the surface may have a rubber or other non-skid material located on the outside (i.e., bottom) so that, when in the revealed position, the eyelid cover 1205 serves as a foot for the desktop electronic device 210, restricting the eyelid cover 1205 from sliding on the desktop 200.

Figure 13:
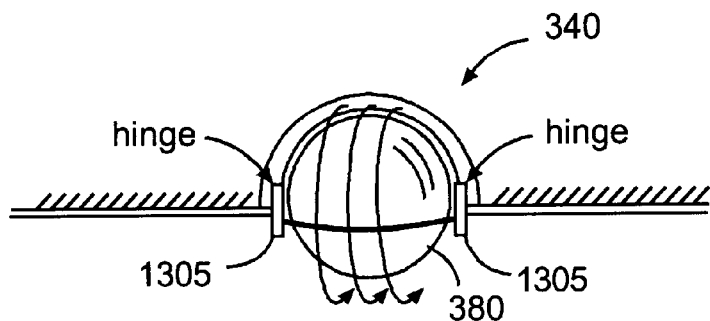
FIG. 13 is a diagram of the mobility assembly of FIG. 3A having a hinge for selectable engagement of the primary revolving member to a desktop.

FIG. 13 is a diagram of the mobility assembly 340 having a hinge 1305 for selectable engagement of the revolving element 380 to the desktop 200. The hinge 1305 couples the mobility assembly 340 to the base 330. In operation, a user may simply rotate the mobility assembly 340 in the direction as indicated to disengage the revolving member 380 from the desktop. The exterior surface of the mobility assembly 380 may be coated with rubber or other non-skid material similar to the eyelid cover 1205 (FIG. 12B).

Figure 14:
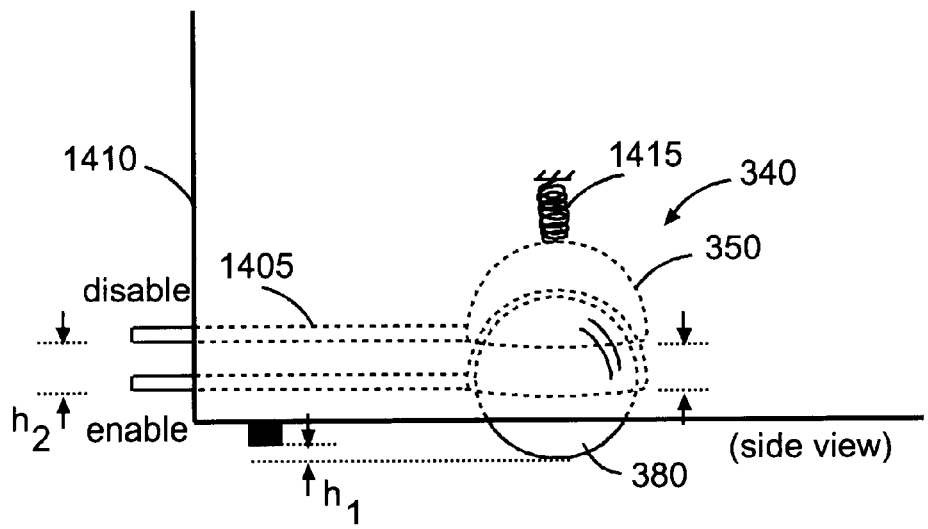
FIG. 14 is a diagram of a side view of the mobility assembly of FIG. 3A having an adjustable cavity for engaging and disengaging the revolving member to a desktop.

FIG. 14 is a diagram of a side view of the mobility assembly 340 having a primary cavity 350 that is adjustable for engaging and disengaging the primary revolving element 380 to the desktop 200. The mobility assembly 340 is brakeless as there is not a braking mechanism, but rather an enabling and disabling mechanism for the revolving element 380. In this embodiment, the enabling and disabling mechanism is referred to as a selector 1405, connected to a wall defining the primary cavity 350. The selector 1405 extends through a side wall 1410 of the base 330. In another embodiment, the selector 1405 extends through the top or bottom of the base 330. The selector 1405 may be a push-button, wheel, or other mechanical or electromechanical mechanism to selectively enable and disable the primary revolving element 380 by providing and substantially removing upper support for the revolving element 380.

A foot 420 may also be coupled to the base 330, where the primary revolving element 380 extends below the foot 420 by a distance of $h_1$ when the surface of the cavity 350 is in the enabled position, as controlled by the selector 1405. And, when the selector 1405 is raised to the disable position, the surface of the primary cavity 350 is raised, or retracted, by a height $h_2$ above the primary revolving element 380, which is greater than the height $h_1$, so that the primary revolving element 380 substantially no longer supports the base 330. In other words, the primary revolving element 380 provides less support to the base 330 than does the foot 420. The function of the retracted position may also be achieved through the use of separating the wall (not shown) defining the primary cavity 350 to disable the primary revolving element 380. In this way, the primary revolving element 380 is not in supporting engagement with the wall defining the primary cavity 350.

A spring 1415 may be utilized to predispose the selector 1405 to be in the enable position and support the desktop electronic device 210. In the enable position, the spring 1415 operates as a shock absorber as the desktop electronic device 210 is translated from a first position to a second position on the desktop 200.

Figure 15:
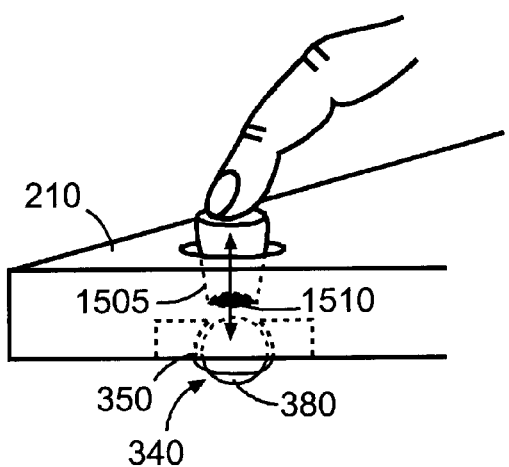
FIG. 15 is an isometric view of the mobility assembly having a brake member extending through the top of the desktop electronic device of FIG. 3A.

FIG. 15 is an isometric view of the mobility assembly 340 having a brake 1505 extending through the top of the chassis of the desktop electronic device 210 and through the wall defining the primary cavity 350. The bottom surface of the brake 1505 has a rubber tip 1510 that prevents the primary revolving element 380 from revolving freely.

The previous description is of at least one embodiment for implementing the invention, and the scope of the invention should not necessarily be limited by this description. The scope of the present invention is instead defined by the following claims.

What is claimed is:

1. An apparatus for providing desktop mobility to a desktop electronic device, said apparatus comprising:
   at least one mobility assembly having a primary revolving member and at least one secondary revolving member in contact with the primary revolving member, said at least one mobility assembly providing mobility for said desktop electronic device to translate from a first position to a second position on a desktop.

2. The apparatus according to claim 1, wherein the at least one secondary revolving member is either spherically or cylindrically shaped.

3. The apparatus according to claim 1, wherein the primary revolving member is spherically shaped.

4. The apparatus according to claim 1, wherein the primary revolving member resides in a primary cavity.

5. The apparatus according to claim 1, wherein the at least one secondary revolving member resides in at least one secondary cavity.

6. The apparatus according to claim 1, wherein the primary member includes at least one of the following materials: rubber, plastic, Teflon, and metal.

7. The apparatus according to claim 1, wherein the apparatus is either (i) a housing of the desktop electronic device, or (ii) a platform for supporting the desktop electronic device.

8. The apparatus according to claim 1, further comprising means for resisting movement of the apparatus.

9. An apparatus for providing mobility to a desktop electronic device, said apparatus comprising:
   a housing;
   at least one mobility assembly having at least one revolving member, said at least one mobility assembly coupled to said housing and providing mobility for the desktop electronic device to translate from a first position to a second position on a desktop; and
   at least one resistance element coupled to said housing and being positionally alterable with respect to said housing to be selectably contacted with the desktop for resisting movement of the apparatus.

10. The apparatus according to claim 9, wherein said at least one resistance element includes an exterior surface having a high coefficient of friction to provide resistance when selectably contacted with the desktop.

11. The apparatus according to claim 9, wherein the at least one mobility assembly includes a primary and at least one secondary revolving member, the primary and secondary revolving members being in continuous contact with one another.

12. The apparatus according to claim 11, wherein the primary revolving member is spherically shaped.

13. The apparatus according to claim 9, wherein said at least one resistance element is a foot.

14. The apparatus according to claim 9, wherein the housing is either (i) integral with the desktop electronic device, or (ii) a platform for supporting the desktop electronic device.

15. The apparatus according to claim 9, wherein said at least one resistance element is positionally alterable in a linear motion.

16. The apparatus according to claim 9, wherein said at least one resistance element is positionally alterable in a rotational motion.

17. An apparatus for providing mobility to a desktop electronic device, said apparatus comprising: at least one mobility assembly having at least one revolving member, said at least one mobility assembly providing mobility for the desktop electronic device to translate from a first position to a second position on a desktop; and
   a rotatable locking mechanism coupled to said at least one mobility assembly, said rotatable locking mechanism being selectably rotated to apply a resistance to the at least one revolving member.

18. The apparatus according to claim 17, wherein rotation of said rotatable locking mechanism applies friction to the at least one revolving member.

19. The apparatus according to claim 18, wherein the friction is generated between said rotatable locking mechanism and an inner surface of said at least one mobility assembly.

20. The apparatus according to claim 17, wherein the at least one revolving member includes a primary and at least one secondary revolving member.

21. The apparatus according to claim 20, wherein the primary revolving member is spherically shaped.

22. The apparatus according to claim 17, further comprising a housing, wherein said at least one mobility assembly and said rotatable locking mechanism are coupled to said housing.

23. The apparatus according to claim 17, wherein said housing defines either (i) the outer surface of the desktop electronic device, or (ii) a platform for supporting the desktop electronic device.

24. The apparatus according to claim 17, wherein the desktop electronic device has a bottom surface and said rotatable locking mechanism extends beneath said bottom surface.

25. The apparatus according to claim 17, wherein said rotatable locking mechanism includes a threaded surface.

26. An apparatus for providing mobility to a desktop electronic device, said apparatus comprising:
   a housing having a bottom surface, at least one mobility assembly coupled to the bottom surface, and having at least one revolving member, said at least one mobility assembly providing mobility for the desktop electronic device to translate from a first position to a second position on a desktop; and
   at least one disengaging element coupled to the bottom surface of said housing and selectably applied to disengage the at least one revolving member from the desktop.

27. The apparatus claim 26, wherein said at least one disengaging element includes at least one of the following:
   an eyelid covert
   a hinge coupled between said at least one mobility assembly and the bottom surface of said housing to provide rotation of said at least one mobility assembly; and
   an adjustable foot coupled to said housing.

28. The apparatus according to claim 26, wherein the housing defines either (i) the outer surface of the desktop electronic device, or (ii) a platform for supporting the desktop electronic device.

29. A desktop electronic device, comprising:
   a housing having a bottom surface and a top surface;
   at least one mobility assembly coupled to said bottom surface, and having at least one revolving member, said at least one mobility assembly providing mobility for the desktop electronic device to translate from a first position to a second position on a desktop; and
   at least one braking element extending through the top surface and selectably applied to said at least one revolving member to apply rotational resistance.

30. A housing adapted in ordinary use to remain stationary and resist lateral movement upon a surface on which it is resting, and capable of selective facilitation of lateral movement upon such surface, comprising:
   a housing base having a bottom in opposing relation to such surface;
   at least one roller mechanism contained within a mounting within the base and extending through the bottom into contact with such surface; and
   an operating mechanism coupled to said housing base and in operative engagement with a support surface forming the mounting associated with a respective one of each of the at least one roller mechanisms, the support surface having a supporting position in supporting engagement with said at least one roller mechanism to support said at least one roller mechanism to provide the lateral movement of the housing and a release position in a retracted position from said at least one roller mechanism thereby preventing said at least one roller mechanism from supporting the housing, said operating mechanism being operative through its connection to the support surface to move the support surface from the engaging position to the release position.

31. The housing according to claim 30, wherein the housing defines at least one of the following: a desktop electronic device and a platform for supporting a desktop electronic device.

32. An apparatus for providing mobility to a desktop electronic device, said apparatus comprising:
   a housing;
   at least one mobility assembly coupled to said housing and having at least one revolving member, said at least one mobility assembly providing mobility for the desktop electronic device to translate from a first position to a second position on a desktop; and
   at least one disengaging element coupled to said housing and operable to be selectively applied to disengage said at least one revolving member from the desktop.

33. The apparatus according to claim 32, wherein said housing includes a bottom surface and a side surface, said at least one mobility assembly being coupled to the bottom surface of said housing.

34. The apparatus according to claim 32, wherein said housing includes a bottom surface and a side surface, said at least one disengaging element being coupled to the bottom surface of said housing.

35. The apparatus according to claim 32, wherein said at least one disengaging element is operable to engage the desktop in disengaging said at least one revolving member from the desktop.

36. The apparatus according to claim 32, wherein said at least one disengaging element is further coupled to said at least one mobility assembly to be selectively applied to disengage said at least one mobility assembly to be selectively applied to disengage said at least one revolving member from the desktop.

* * * * *